(No Model.)
C. NICHOLSON.
DRIVING MECHANISM FOR SEWING MACHINES.
No. 357,223. Patented Feb. 8, 1887.
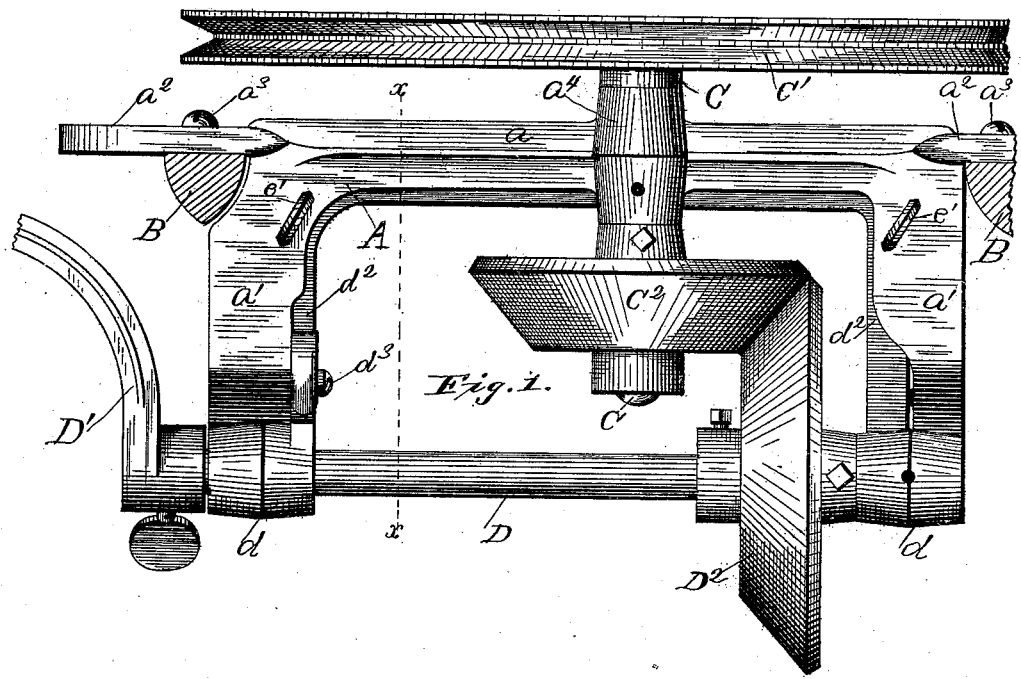
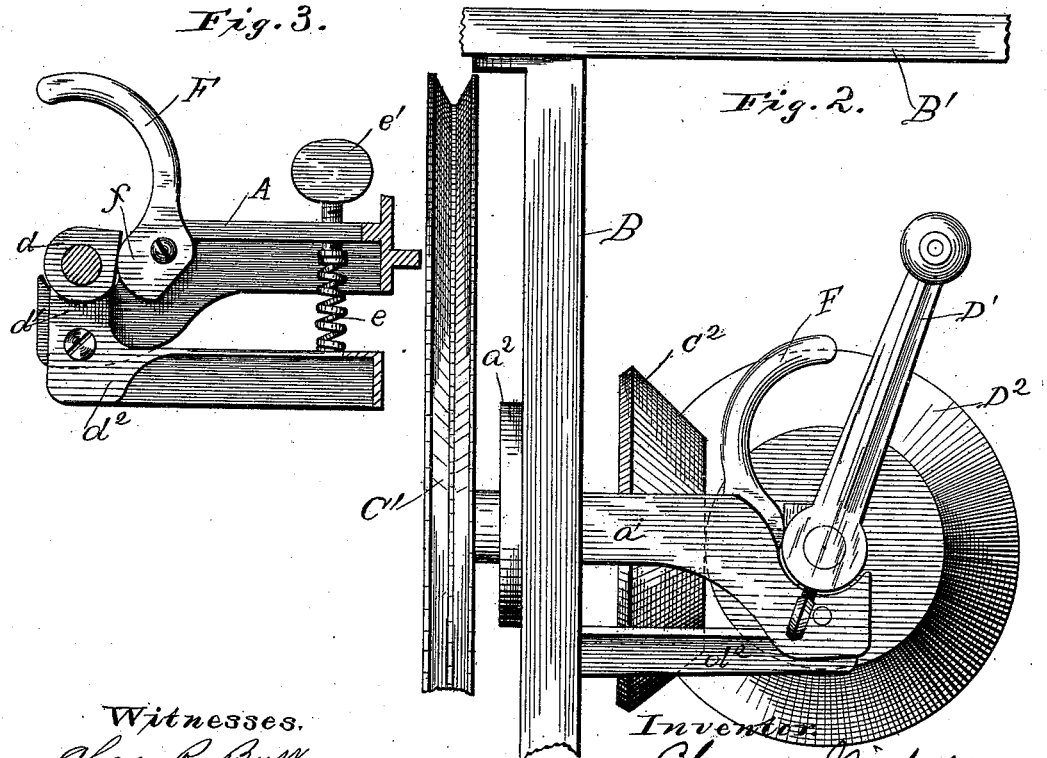
Witnesses.
Chas. R. Butt
A. G. Stewart
Inventor
Charles Nicholson
by Church & Church
his Attorneys.

UNITED STATES PATENT OFFICE.

CHARLES NICHOLSON, OF PHILADELPHIA, PA., ASSIGNOR TO THE NICHOLSON STORAGE AND SPRING MOTOR COMPANY, OF WASHINGTON, D. C.

DRIVING MECHANISM FOR SEWING-MACHINES.

SPECIFICATION forming part of Letters Patent No. 357,223, dated February 8, 1887.

Application filed August 18, 1885. Renewed April 2, 1886. Serial No. 197,583. (No model.)

*To all whom it may concern:*

Be it known that I, CHARLES NICHOLSON, of Philadelphia, in the county of Philadelphia and State of Pennsylvania, have invented certain new and useful Improvements in Driving Mechanism for Sewing-Machines; and I do hereby declare the following to be a full, clear, and exact description of the same, reference being had to the accompanying drawings, and to the figures and letters of reference marked thereon.

The object of my present invention is to furnish a mechanism for driving sewing and other machines by hand, which is complete in itself, can readily be applied to machines of any ordinary or usual construction, and is provided with appliances for connecting and disconnecting the supplemental from the main driving shaft, whereby the hand-power may be used alone, or, if applied to a machine having the usual foot-power appliances, either or both may be used, as desired.

The mechanism illustrating the embodiment of my said invention will first be described, and the novel elements and combinations pointed out in the claims.

In the accompanying drawings, Figure 1 is a top plan view of my device, showing its application to the legs or standards of a sewing-machine. Fig. 2 is a side elevation, and Fig. 3 a section, on the line $x\ x$ of Fig. 1.

Similar letters of reference in the several figures denote the same parts.

The main frame A of the attachment consists of a body or cross-piece, $a$, provided with two arms or parallel extensions, $a'$, whose outer ends are bent or curved downward, as shown in Fig. 2. Projecting laterally from each end of the cross-piece $a$, and preferably cast integral therewith, is a lug or ear, $a^2$, to receive a screw, $a^3$, or equivalent fastening device, whereby the main frame is attached and secured to the legs or standards B, supporting one end of the table B', upon which the sewing-machine is mounted.

The cross-piece $a$ is provided with a transverse box or bearing, $a^4$, to receive the main driving-shaft C, which latter has secured to it the fly-wheel or driving-pulley C' and a beveled friction or equivalent gear, $C^2$. If the machine is provided with a foot-power, the latter may be connected to a crank applied to the shaft C, as is usual in sewing-machines.

The supplemental driving-shaft D, provided at one end with the handle D', and carrying a bevel friction or equivalent gear, $D^2$, for co-operation with the gear $C^2$, is mounted in bearings $d$, formed in the arms or extensions $d'$ of a supplemental yoke or frame, $d^2$, the latter being pivotally mounted upon the outer ends of the arms or extensions $a'$ of the main frame A. The pivots $d^3$, upon which the supplemental yoke $d^2$ is hung, are located in the curved extensions of the arms $a'$, and at such a distance below or to one side of the main driving-shaft C as that when the gear $D^2$ is held in operative engagement with the gear $C^2$ the supplemental driving-shaft D will be sustained in substantially the same plane as the driving-shaft C.

The yoke or frame $d^2$, carrying the supplemental driving-shaft D, is oscillated on its pivots, and in a direction to hold the gear $D^2$, pressed firmly in contact with the gear $C^2$, on the main driving-shaft by one or more (two are preferred) springs, $e$, bearing at one end against the said yoke $d^2$ and at the other upon an adjustable support—such as a screw, $e'$—carried by or passing through the main frame A, whereby the degree of pressure or frictional contact of the driving-gears can be regulated. I prefer to employ two adjustable springs, one at each end of the yoke $d^2$, and in proximity to the bearings therein, for the shaft D, in order that the pressure on each bearing may be separately adjusted, whereby the springing of the yoke and the springing or twisting of the bearings out of line is prevented.

Upon one of the arms $a$ of the frame A is pivoted a lever, F, provided with a cam, $f$, which makes contact with the side of one of the arms $d'$ of the pivoted yoke $d^2$, or of the bearing $d$ therein.

When the lever F is turned in a direction to cause the cam $f$ to press upon the arm $d'$, the yoke $d^2$ will be vibrated upon its supporting-pivots in a direction to carry the shaft D away from the shaft C, compressing the springs and effecting a separation of the friction-gears. By turning the lever F in the opposite direction the springs e will immediately bring the yoke back to its first position and hold the gears in frictional contact, so that when power is applied to the supplemental driving-shaft it will be transmitted through the gears to the main driving-shaft, and from the pulley thereon to the sewing or other machine.

Having thus described my invention, I claim as new—

1. The combination, in a motor such as described, of the main and supplemental driving-shafts, the frame provided with a bearing for the main driving-shaft, the yoke pivotally secured to said frame and provided with bearings for the supplemental driving-shaft, the gears on the main and supplemental shafts, and the springs interposed between the yoke and frame, serving to press and hold the gears in contact, substantially as described.

2. In combination with the main and supplemental driving-shafts, the main frame supporting the main driving-shaft and provided with ears or lugs for attachment to the legs or standards of the machine, the yoke carrying the transverse supplemental driving-shaft pivotally supported on arms attached to said main frame and in the same plane as the main driving-shaft, the friction-gears on the said main and supplemental shafts, a spring for oscillating the said yoke to hold the gears in engagement, and a cam acting upon the yoke to separate the gears, substantially as described.

3. The combination, with the main and supplemental driving-shafts, main frame provided with the ears or lugs for attachment to the standards, the transverse bearing for the main shaft, and the two arms with curved extensions, as described, of the yoke pivoted to the said curved extensions below the plane of the main shaft and provided with bearings in its ends or arms for the supplemental driving-shaft, the beveled friction-gears applied to the main and supplemental driving-shafts, the springs interposed between the main frame and pivoted yoke, and the cam acting upon the yoke and in opposition to the spring, substantially as described.

4. The combination of the main and supplemental driving-shafts, main frame carrying the main driving-shaft, and the yoke pivotally secured thereto and carrying the transverse supplemental driving-shaft, and the adjustable springs applied to the ends of the yokes and near the bearings, substantially as described.

5. In combination with a sewing-machine table, a detachable driving mechanism located between and attached to the legs or standards, said driving mechanism consisting, essentially, of a main and supplemental driving-shaft, a main frame having a bearing for the main driving-shaft, a yoke carrying the supplemental driving-shaft and pivoted to said main frame, springs for oscillating the yoke in one direction and a cam for operating it in the other, the said supplemental driving-shaft being provided with a handle and friction-gear, and the main driving-shaft with a corresponding friction-gear and balance-wheel or pulley, substantially as and for the purpose set forth.

CHAS. NICHOLSON.

Witnesses:
MELVILLE CHURCH,
A. S. STEWART.